United States Patent
Nomaru

(10) Patent No.: US 11,679,449 B2
(45) Date of Patent: Jun. 20, 2023

(54) OPTICAL AXIS ADJUSTMENT JIG AND METHOD OF CONFIRMING OPTICAL AXIS OF LASER PROCESSING APPARATUS

(71) Applicant: DISCO CORPORATION, Tokyo (JP)

(72) Inventor: Keiji Nomaru, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 384 days.

(21) Appl. No.: 17/005,976

(22) Filed: Aug. 28, 2020

(65) Prior Publication Data
US 2021/0069827 A1  Mar. 11, 2021

(30) Foreign Application Priority Data
Sep. 5, 2019 (JP) .............................. JP2019-162456

(51) Int. Cl.
*B23K 26/08* (2014.01)
*B23K 26/70* (2014.01)
*B23K 26/082* (2014.01)
*B23K 37/04* (2006.01)

(52) U.S. Cl.
CPC ........ *B23K 26/0853* (2013.01); *B23K 26/082* (2015.10); *B23K 26/705* (2015.10); *B23K 37/0443* (2013.01); *B23K 37/0452* (2013.01)

(58) Field of Classification Search
CPC .............. B23K 26/705; B23K 26/0853; B23K 37/0452; B23K 37/0408; B23K 26/035
See application file for complete search history.

(56) References Cited

U.S. PATENT DOCUMENTS

| 5,463,202 A * | 10/1995 | Kurosawa | B23K 26/04 372/29.014 |
| 5,812,629 A * | 9/1998 | Clauser | A61B 6/502 378/7 |
| 2019/0094429 A1 * | 3/2019 | Park | G02B 1/14 |

FOREIGN PATENT DOCUMENTS

| JP | 2010099667 A | 5/2010 |
| JP | 2011025279 A | 2/2011 |

\* cited by examiner

*Primary Examiner* — Thien S Tran
(74) *Attorney, Agent, or Firm* — Greer, Burns & Crain, Ltd.

(57) ABSTRACT

There is provided an optical axis adjustment jig including a flat parallel-surface plate having an upper surface and a lower surface with reflective films disposed respectively thereon, and an image capturing unit disposed beneath the flat parallel-surface plate for capturing an image of a laser beam applied thereto. The flat parallel-surface plate is made of a material that is transmissive of a wavelength of the laser beam. The laser beam is applied through the flat parallel-surface plate to the image capturing unit. A tilt of the optical axis of the laser beam is detected on the basis of the shape of the beam spot of the laser beam whose image has been captured by the image capturing unit.

5 Claims, 10 Drawing Sheets

OPTICAL AXIS ADJUSTMENT JIG AND METHOD OF CONFIRMING OPTICAL AXIS OF LASER PROCESSING APPARATUS

BACKGROUND OF THE INVENTION

Field of the Invention

The present invention relates to an optical axis adjustment jig and a method of confirming an optical axis of a laser processing apparatus.

Description of the Related Art

Laser processing apparatuses for processing a workpiece with a laser beam are arranged such that the laser beam that is emitted from a laser oscillator is propagated to a processing point by a plurality of optical devices and focused by a condensing lens to process the workpiece (see, for example, JP 2010-099667A and JP 2011-25279A).

SUMMARY OF THE INVENTION

In the existing laser processing apparatuses disclosed in JP 2010-099667A and JP 2011-25279A, etc., if the laser beam is applied slantwise to the workpiece, then the workpiece may possibly be processed with defects, for example, the workpiece may be processed obliquely or the opposite sides of a groove defined in the workpiece by the laser beam may be separately processed. Consequently, the existing laser processing apparatuses are required to adjust the optical axis of the laser beam so that the laser beam will be applied perpendicularly to the workpiece.

It is currently the general practice to confirm a returning beam using a mirror that reflects the laser beam for ensuring that the laser beam is applied perpendicularly to the workpiece. However, the general confirming method is problematic in that the criterion for assessing whether or not laser beam is applied perpendicularly to the workpiece is indefinite as the confirmation is based on eye measurement.

It is therefore an object of the present invention to provide an optical axis adjustment jig and a method of confirming an optical axis of a laser processing apparatus which make it possible to quantitatively assess whether or not the optical axis of a laser beam is perpendicular to a workpiece.

In accordance with an aspect of the present invention, there is provided an optical axis adjustment jig including a flat parallel-surface plate having an upper surface and a lower surface with reflective films disposed respectively thereon, and an image capturing unit disposed beneath the flat parallel-surface plate for capturing an image of a laser beam applied thereto. The flat parallel-surface plate is made of a material that is transmissive of a wavelength of the laser beam, the laser beam is applied through the flat parallel-surface plate to the image capturing unit, and a tilt of the optical axis of the laser beam is capable of being detected on the basis of an image, captured by the image capturing unit, of internal reflections in the flat parallel-surface plate of the laser beam.

Preferably, the optical axis adjustment jig further includes a display unit for displaying the image captured by the image capturing unit.

In accordance with another aspect of the present invention, there is provided a method of confirming an optical axis of a laser processing apparatus including a chuck table for holding a workpiece thereon, a laser beam applying unit for processing the workpiece held on the chuck table by applying a laser beam from a laser oscillator thereto, and a moving assembly for moving the chuck table and the laser beam applying unit relatively to each other in X-axis directions and Y-axis directions perpendicular to the X-axis directions. The method includes a preparatory step of preparing an optical axis adjustment jig including a flat parallel-surface plate made of a material that is transmissive of a wavelength of the laser beam and having an upper surface and a lower surface with reflective films disposed respectively thereon, and an image capturing unit disposed beneath the flat parallel-surface plate for capturing an image of the laser beam, an optical axis adjustment jig positioning step of positioning the optical axis adjustment jig for applying the laser beam through the flat parallel-surface plate to the image capturing unit, an image capturing step, after the optical axis adjustment jig positioning step, of applying the laser beam emitted from the laser oscillator to the image capturing unit and capturing an image of the laser beam applied to the image capturing unit, and a tilt detecting step of detecting a tilt of the optical axis of the laser beam on the basis of an image, captured by the image capturing unit, of internal reflections in the flat parallel-surface plate of the laser beam.

Preferably, in the method of confirming the optical axis of a laser processing apparatus, the laser processing apparatus further includes a display unit for displaying the image captured by the image capturing unit.

The present invention is advantageous in that it is possible to quantitatively assess whether or not the optical axis of a laser beam is perpendicular to a workpiece.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

A preferred embodiment of the present invention will be described in detail below with reference to the drawings. The present invention is not limited to the details of the embodiment described below. The components described below cover those which could easily be anticipated by those skilled in the art and those which are essentially identical thereto. Furthermore, the arrangements described below can be used in appropriate combinations. Various omissions, replacements, or changes of the arrangements may be made without departing from the scope of the present invention.

EMBODIMENT

Figure 1:
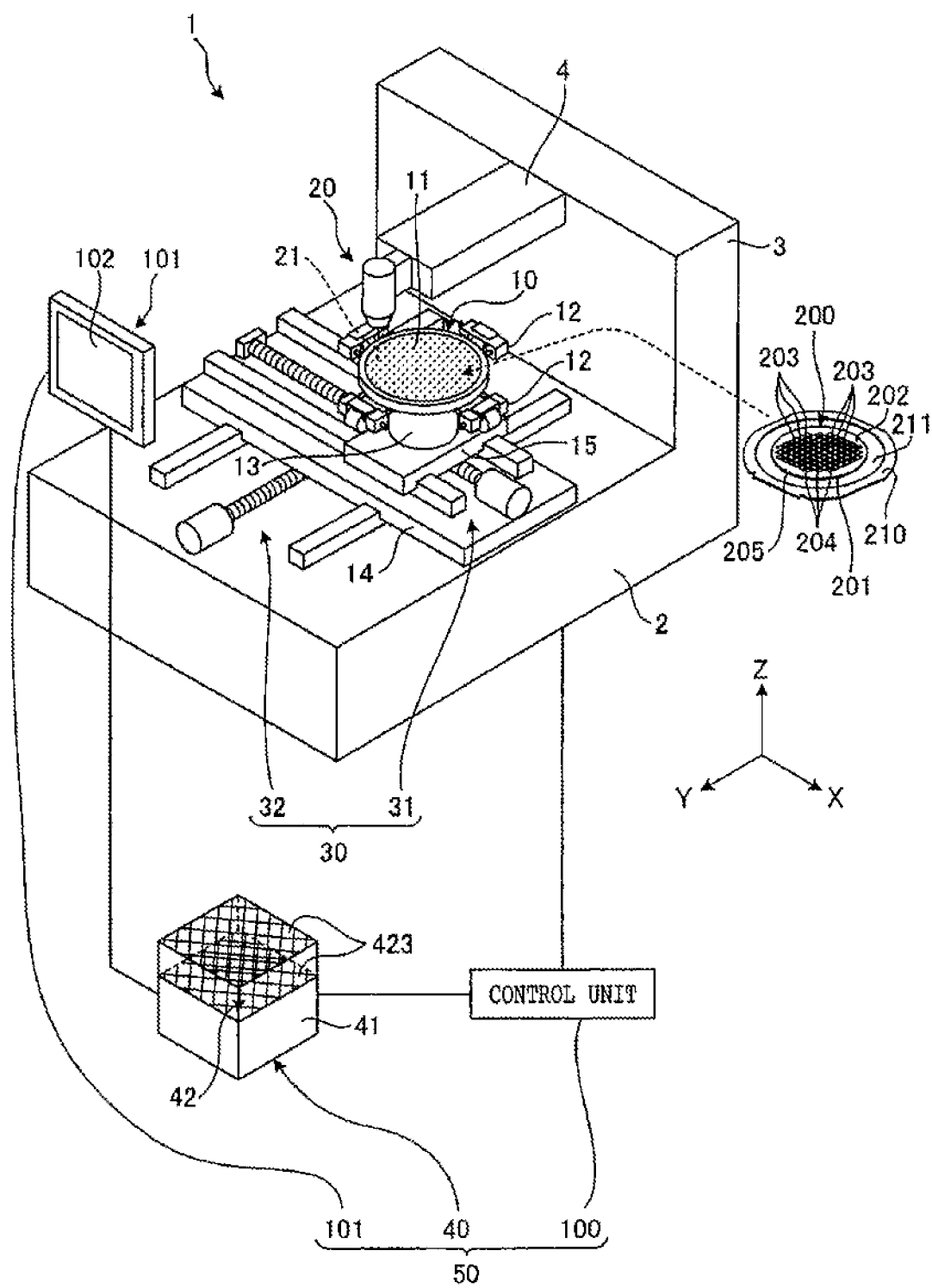
FIG. 1 is a perspective view illustrating a configuration example of a laser processing apparatus that carries out a method of confirming an optical axis of a laser processing apparatus according to an embodiment of the present invention.
Figure 2:
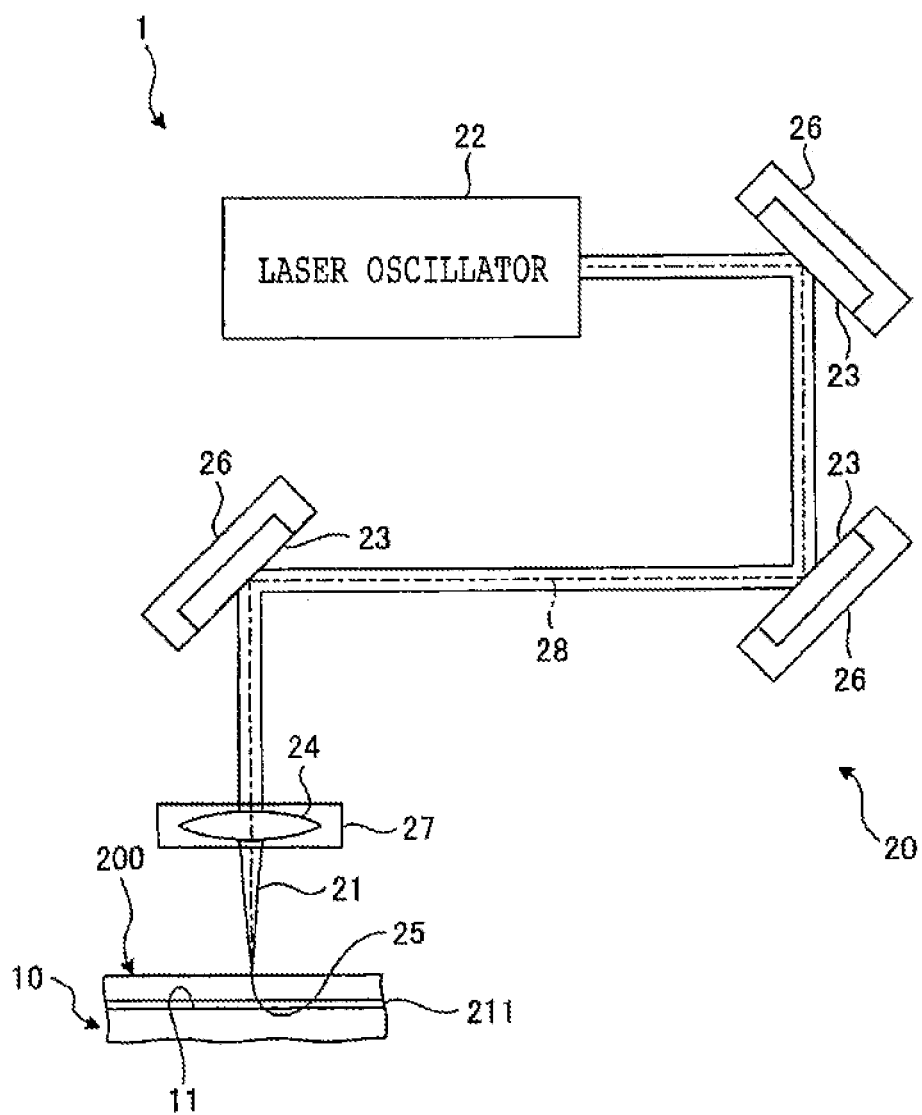
FIG. 2 is a schematic view illustrating the make-up of a laser beam applying unit of the laser processing apparatus illustrated in FIG. 1.
Figure 3:
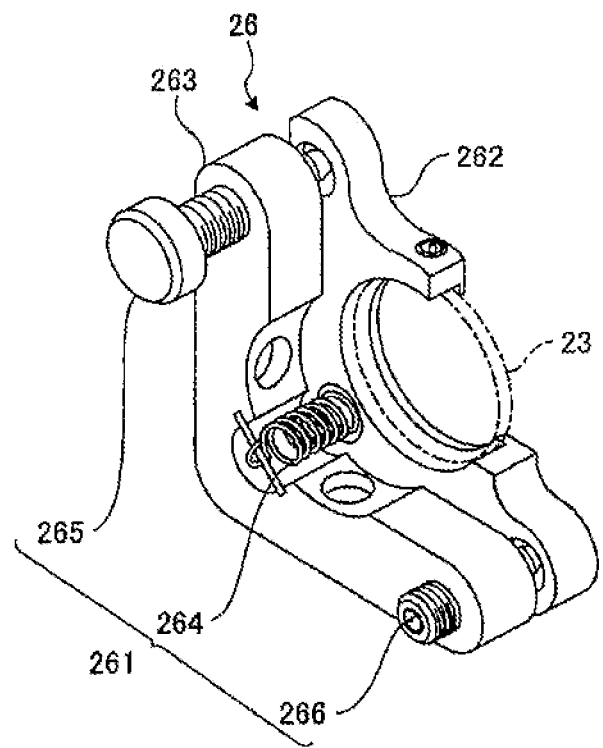
FIG. 3 is a perspective view illustrating a configuration example of a mirror holder of the laser beam applying unit illustrated in FIG. 2.
Figure 4:
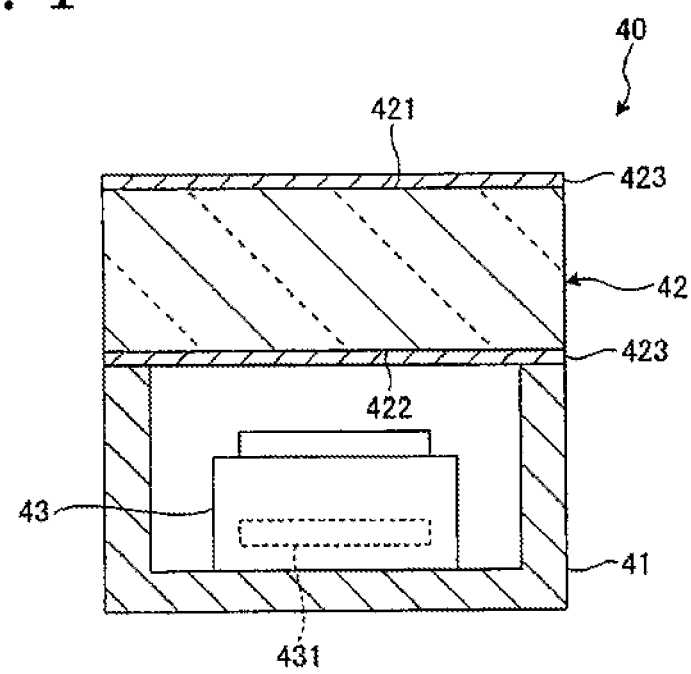
FIG. 4 is a cross-sectional view illustrating a configuration of a beam detecting unit of an optical axis adjustment jig according to the embodiment.
Figure 5:
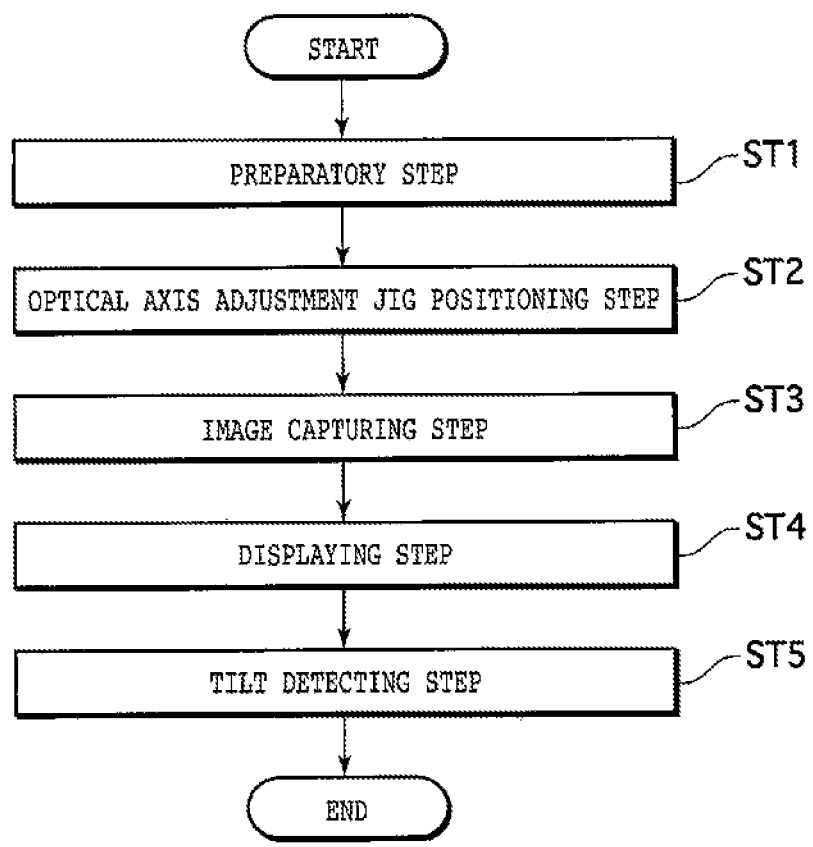
FIG. 5 is a flowchart of a sequence of an optical axis confirming method to be performed on the laser processing apparatus according to the embodiment.

An optical axis adjustment jig and a method of confirming an optical axis of a laser processing apparatus according to an embodiment of the present invention will be described below with reference to the drawings. FIG. 1 illustrates in perspective a configuration example of a laser processing apparatus that carries out a method of confirming an optical axis of a laser processing apparatus according to the embodiment. FIG. 2 schematically illustrates the make-up of a laser beam applying unit of the laser processing apparatus illustrated in FIG. 1. FIG. 3 illustrates in perspective a configuration example of a mirror holder of the laser beam applying unit illustrated in FIG. 2. FIG. 4 illustrates in cross section a configuration of a beam detecting unit of an optical axis adjustment jig according to the embodiment. FIG. 5 is a flowchart of a sequence of an optical axis confirming method to be performed on the laser processing apparatus according to the embodiment.

The method of confirming the optical axis of a laser processing apparatus (hereinafter referred to as "optical axis confirming method") according to the present embodiment is carried out by a laser processing apparatus, denoted by 1, illustrated in FIG. 1. The laser processing apparatus 1 illustrated in FIG. 1 is an apparatus for processing a workpiece 200 by applying a laser beam 21 to the workpiece 200.

The workpiece 200 as a target to be processed by the laser processing apparatus 1 illustrated in FIG. 1 is a wafer such as a disk-shaped semiconductor wafer or an optical device wafer having a substrate 201 made of silicon, sapphire, gallium arsenide, or the like. As illustrated in FIG. 1, the workpiece 200 has a grid of projected dicing lines 203 established on a face side 202 of the substrate 201 and a plurality of devices 204 disposed in respective areas demarcated on the face side 202 by the projected dicing lines 203. The devices 204 may be integrated circuits (ICs), large-scale integration (LSI) circuits, or image sensors such as charge-coupled devices (CCDs) or complementary metal oxide semiconductor (CMOS) image sensors.

According to the present embodiment, the workpiece 200 has its reverse side 205, opposite the face side 202, affixed to an adhesive tape 211 in the form of a circular sheet that is larger in diameter than the workpiece 200 and has an outer circumferential edge portion affixed to an annular frame 210. Therefore, the workpiece 200 is supported in the opening of the annular frame 210 by the adhesive tape 211. According to the present embodiment, the workpiece 200 will be divided along the projected dicing lines 203 into individual device chips having the respective devices 204.

(Laser Processing Apparatus)

As illustrated in FIG. 1, the laser processing apparatus 1 includes a chuck table 10 for holding the workpiece 200 on a holding surface 11 thereof, a laser beam applying unit 20, a moving assembly 30, and a control unit 100.

The chuck table 10 holds the workpiece 200 on the holding surface 11. The holding surface 11 is of a disk shape made of porous ceramics or the like and is connected to a vacuum suction source, not illustrated, through a vacuum suction passageway, not illustrated. The chuck table 10 holds the workpiece 200 under suction that is placed on the holding surface 11. According to the present embodiment, the holding surface 11 is a flat surface lying parallel to horizontal directions. A plurality of clamps 12 for gripping and clamping the annular frame 210 that supports the workpiece 200 in its opening are disposed around the chuck table 10. The chuck table 10 is rotatable about its own central axis parallel to Z-axis directions by a rotary unit 13. The Z-axis directions extend perpendicularly to the holding surface 11 and parallel to vertical directions. The rotary unit 13 and the chuck table 10 are movable in X-axis directions, extending perpendicularly to the Z-axis directions, by an X-axis moving unit 31, to be described later, of the moving assembly 30.

The laser beam applying unit 20 is a unit for processing the workpiece 200 held on the chuck table 10 by applying a pulsed laser beam 21 to the workpiece 200. According to the present embodiment, as illustrated in FIG. 1, the laser beam applying unit 20 has a portion supported on the distal end of a support beam 4 that is attached at its proximal end an upstanding wall 3 mounted on an apparatus base 2.

As illustrated in FIG. 2, the laser beam applying unit 20 includes a laser oscillator 22 for emitting the laser beam 21 for processing the workpiece 200, a plurality of mirrors 23 for reflecting the laser beam 21 emitted from the laser oscillator 22 toward the workpiece 200 held on the holding surface 11 of the chuck table 10, a condensing lens 24 for focusing the laser beam 21 reflected by the mirrors 23 onto the workpiece 200, and focused spot position adjusting means, not illustrated, for displacing a focused spot 25 of the laser beam 21 along the Z-axis directions.

The laser beam 21 that is applied from the laser beam applying unit 20 to the workpiece 200 may have a wavelength that can be transmitted through the workpiece 200 or a wavelength that can be absorbed by the workpiece 200.

The mirrors 23 are optical devices for propagating the laser beam 21 from the laser oscillator 22 to a processing point where the laser beam 21 processes the workpiece 200. The condensing lens 24 is an optical device for propagating and focusing the laser beam 21 from the laser oscillator 22 onto the focusing point on the workpiece 200. The laser beam applying unit 20 also includes a plurality of mirror holders 26 as optical device holders that hold the respective mirrors 23, and a lens holder 27 as an optical device holder that holds the condensing lens 24. The mirror holders 26 and the lens holder 27 have respective adjusting mechanisms 261 (see FIG. 3) for adjusting an optical axis 28 (indicated by a dot-and-dash line in FIG. 2) of the laser beam 21. The mirror holders 26 and the lens holder 27 are of essentially identical configurations, and the adjusting mechanisms 261 of the mirror holders 26 and the lens holder 27 have essentially identical functions. One of the mirror holders 26 will be described below with reference to FIG. 3, and the description of the lens holder 27 will be omitted below. According to the present embodiment, the adjusting mechanisms 261 have essentially identical functions, as described above. According to the present invention, however, the mirror holders 26 may have a tilt adjusting function and the lens holder 27 may be free of a tilt adjusting function and have only an X-/Y-axis moving function.

According to the present embodiment, as illustrated in FIG. 3, the mirror holder 26 includes a first plate 262 that holds the mirror 23, a second plate 263 fixed to the laser processing apparatus 1, and an adjusting mechanism 261. The first plate 262 and the second plate 263 are L-shaped. The first plate 262 holds the mirror 23 in its central region.

The adjusting mechanism 261 includes a spring 264 interconnecting the first plate 262 and the second plate 263 and normally biasing the first plate 262 and the second plate 263 to move toward each other, and a pair of adjusting screws 265 and 266. According to the present embodiment, the spring 264 interconnects respective central regions of the first plate 262 and the second plate 263. The adjusting screws 265 and 266 are threaded through respective both ends of the second plate 263 and have respective tip ends abutting against both end portions of the first plate 262. When the adjusting screws 265 and 266 are turned about their own axes, distances between the both ends of the first and second plates 262 and 263 are adjusted to adjust the orientation of the optical axis of the mirror 23, i.e., the position of the optical axis 28 of the laser beam 21.

According to the present embodiment, the mirrors 23 and the condensing lens 24 are illustrated as optical devices. According to the present invention, however, optical devices are not limited to the mirrors 23 and the condensing lens 24. According to the present embodiment, the mirror holders 26 and the lens holder 27 are illustrated as optical device holders. According to the present invention, however, optical device holders are not limited to the mirror holders 26 and the lens holder 27. According to the present invention, furthermore, the configurations of the mirror holders 26 and the lens holder 27 as optical device holders are not limited to the configurations illustrated in the embodiment.

According to the present embodiment, the laser beam 21 applied from the laser beam applying unit 20 to the workpiece 200 has a circular cross-sectional shape in a plane perpendicular to the optical axis 28. According to the present invention, the cross-sectional shape of the laser beam 21 is not limited to a circular cross-sectional shape.

The moving assembly 30 moves the chuck table 10 and the laser beam applying unit 20 relatively to each other in the X-axis directions and Y-axis directions perpendicular to the X-axis directions. The X-axis directions and the Y-axis directions extend parallel to the holding surface 11. The moving assembly 30 includes an X-axis moving unit 31 as processing feed means for moving the chuck table 10 in the X-axis directions and a Y-axis moving unit 32 as indexing feed means for moving the chuck table 10 in the Y-axis directions.

According to the present embodiment, the Y-axis moving unit 32 is mounted on the apparatus base 2 of the laser processing apparatus 1. The Y-axis moving unit 32 supports a moving plate 14 so as to be movable in the Y-axis directions thereon, the moving plate 14 supporting the X-axis moving unit 31 thereon. The X-axis moving unit 31 is mounted on the moving plate 14. The X-axis moving unit 31 supports a second moving plate 15 so as to be movable in the X-axis directions thereon, the second moving plate 15 supporting the rotary unit 13 for rotating the chuck table 10 about a central axis parallel to the Z-axis directions.

The X-axis moving unit 31 and the Y-axis moving unit 32 include respective known ball screws rotatable about their own central axes, respective known stepping motors for rotating the respective ball screws about their own central axes, and respective pairs of known guide rails that support the respective moving plates 14 and 15 so as to be movable in the X-axis directions and the Y-axis directions, respectively, thereon.

The laser processing apparatus 1 further includes an X-axis direction position detecting unit, not illustrated, for detecting the position of the chuck table 10 in the X-axis directions and a Y-axis direction position detecting unit, not illustrated, for detecting the position of the chuck table 10 in the Y-axis directions. The X-axis direction position detecting unit and the Y-axis direction position detecting unit output detected positions to the control unit 100.

The control unit 100 controls the components described above of the laser processing apparatus 1 to enable the laser processing apparatus 1 to process the workpiece 200. The control unit 100 is a computer including an arithmetic processing apparatus having a microprocessor such as a central processing unit (CPU), a storage apparatus having a memory such as a read only memory (ROM) or a random access memory (RAM), and an input/output interface apparatus. The arithmetic processing apparatus of the control unit 100 performs various arithmetic processing operations according to computer programs stored in the storage apparatus, and generates and outputs various control signals for controlling the laser processing apparatus 1 through the input/output interface apparatus to the above components of the laser processing apparatus 1, thereby realizing the functions of the control unit 100.

The laser processing apparatus 1 also includes a display unit 101 such as a liquid crystal display apparatus for displaying states of processing operations and images, and an input unit, not illustrated, to be used by the operator of the laser processing apparatus 1 to register processing detail information, etc. The display unit 101 and the input unit are electrically connected to the control unit 100. The input unit includes at least one of a touch panel included in the display unit 101 and an external input apparatus such as a keyboard. The display unit 101 includes a display screen 102 for displaying information and images that can be changed by operator's actions entered through the input unit or the like.

As illustrated in FIG. 1, the control unit 100 can be connected to a beam detecting unit 40. The beam detecting unit 40 is able to detect the tilt of the laser beam 21 emitted from the laser oscillator 22 and propagated by the mirrors 23 and the condensing lens 24, from the directions perpendicular to the holding surface 11, i.e., the Z-axis directions. As illustrated in FIG. 4, the beam detecting unit 40 includes a casing 41 as an outer shell of the beam detecting unit 40, a flat parallel-surface plate 42 supported on the casing 41 and having an upper surface 421 and a lower surface 422 with reflective films 423 disposed respectively thereon, and an image capturing unit 43 housed in the casing 41.

The casing 41 is of a box shape, and can be placed on the holding surface 11 of the chuck table 10 according to the present embodiment. The upper and lower surfaces 421 and 422 of the flat parallel-surface plate 42 lie parallel to each other. When the casing 41 is placed on the holding surface 11, the upper and lower surfaces 421 and 422 of the flat parallel-surface plate 42 lie parallel to the holding surface 11. When the casing 41 is placed on the holding surface 11, furthermore, the upper and lower surfaces 421 and 422 of the flat parallel-surface plate 42 are spaced apart from each other in the Z-axis directions. The reflective films 423 of the flat parallel-surface plate 42 reflect the laser beam 21.

The flat parallel-surface plate 42 includes a base body made of an optical glass material such as synthetic quartz, BK7, or borosilicate glass. In other words, the base body is made of a material through which the laser beam 21 can be transmitted. The upper and lower surfaces 421 and 422 of the flat parallel-surface plate 42 are actually upper and lower surfaces of the base body, and the reflective films 423 are disposed on the upper and lower surfaces of the base body. In a case where the laser beam 21 is an infrared laser beam, the base body of the flat parallel-surface plate 42 may be made of silicon. According to the present embodiment, the flat parallel-surface plate 42 has a thickness ranging from 20 to 40 mm. However, the present invention is not limited to such details. The thickness of the flat parallel-surface plate 42 may exceed 40 mm.

The reflectance of the reflective films 423 of the flat parallel-surface plate 42 with respect to the laser beam 21 is in the range of 98% to 99%, for example. Each of the reflective films 423 is in the form of a dielectric multilayer film or a metal film. While the flat parallel-surface plate 42 reflects most of the laser beam 21 of its reflective films 423, it transmits a few % of the laser beam 21 therethrough.

The image capturing unit 43 is disposed beneath the flat parallel-surface plate 42. The image capturing unit 43 is able to capture an image of the laser beam 21 emitted from the laser oscillator 22 and propagated by the mirrors 23 and the condensing lens 24. The image capturing unit 43 includes an image capturing device 431 such as a CCD imaging device or a CMOS imaging device for capturing an image of the laser beam 21. The image capturing device 431 captures an image of the laser beam 21 within a predetermined field of vision. The image capturing unit 43 obtains an image of the laser beam 21 captured in the predetermined field of vision by the image capturing device 431, i.e., an image including the laser beam 21, and outputs the obtained image to the control unit 100 and the display unit 101. The display unit 101 displays the image input from the image capturing unit 43, i.e., the image captured by the image capturing unit 43, on the display screen 102.

Furthermore, the control unit 100 is able to calculate the tilt of the optical axis 28 of the laser beam 21 from the Z-axis directions, and a direction in which the optical axis 28 is tilted, on the basis of the image input from the image capturing unit 43. As the tilt of the optical axis 28 of the laser beam 21, whose image has been captured by the image capturing unit 43, from the Z-axis directions increases, the beam spot of the laser beam 21 varies in shape in the image captured by the image capturing unit 43. For example, a longitudinal direction of the beam spot of the laser beam 21 varies in shape in the image captured by the image capturing unit 43 represents the direction in which the laser beam 21 is tilted from the Z-axis direction. The beam spot of the laser beam 21 in the image captured by the image capturing unit 43 represents an image of internal reflections in the flat parallel-surface plate 42. According to the present embodiment, the control unit 100 stores in advance a relation between tilts from the Z-axis directions of the laser beam 21 whose images has been captured by the image capturing unit 43 and areas of the laser beam 21 in the images captured by the image capturing unit 43, and a relation between longitudinal directions of the images captured by the image capturing unit 43 and directions in which the laser beam 21 is tilted from the Z-axis directions. The control unit 100 calculates the tilt of the optical axis 28 of the laser beam 21 from the Z-axis directions, and a direction in which the optical axis 28 is tilted on the basis of an image captured by the image capturing unit 43. The beam detecting unit 40, the display unit 101, and the control unit 100 jointly make up an optical axis adjustment jig 50.

Prior to a processing operation for processing the workpiece 200, the adjusting mechanisms 261 of the holders 26 and 27 are operated to adjust the optical axis 28 of the laser beam 21 in advance. The operator registers processing detail information in the control unit 100 through the input unit. The operator places the workpiece 200 on the holding surface 11 of the chuck table 10 with the adhesive tape 211 interposed therebetween. When the control unit 100 receives a processing operation start command from the operator through the input unit, the laser processing apparatus 1 starts the processing operation on the workpiece 200 on the basis of the registered processing detail information.

In the processing operation, the workpiece 200 is held under suction on the holding surface 11 of the chuck table 10 with the adhesive tape 211 interposed therebetween, and the annular frame 210 is clamped in position by the clamps 12. On the basis of the processing detail information, the moving assembly 30 moves the laser beam applying unit 20 and the workpiece 200 relatively to each other along one of the projected dicing lines 203, and the laser beam applying unit 20 applies the pulsed laser beam 21 to the workpiece 200, thereby processing the workpiece 200 along the projected dicing line 203 with the laser beam 21. After having processed the workpiece 200 along all the projected dicing lines 203 with the laser beam 21, the laser processing apparatus 1 stops applying the laser beam 21 from the laser beam applying unit 20 to the workpiece 200, finishing the processing operation.

When the laser processing apparatus 1 starts up, suffers an operation error, or does not achieve a desired processed result, the optical axis 28 of the laser beam 21 is confirmed and adjusted.

(Method of Confirming the Optical Axis of a Laser Processing Apparatus)

The method of confirming the optical axis of a laser processing apparatus according to the present embodiment refers to a method of confirming the optical axis 28 of the laser beam 21 in the laser processing apparatus 1 described above. As illustrated in FIG. 5, the method of confirming the optical axis 28 of the laser beam 21 in the laser processing apparatus 1 includes a preparatory step ST1, an optical axis adjustment jig positioning step ST2, an image capturing step ST3, a displaying step ST4, and a tilt detecting step ST5.

(Preparatory Step)

The preparatory step ST1 is a step of preparing the optical axis adjustment jig 50 referred to above. In the preparatory step ST1, the beam detecting unit 40 is prepared, and the beam detecting unit 40 is electrically connected to the display unit 101 and the control unit 100. Then, control goes to the optical axis adjustment jig positioning step ST2.

(Optical Axis Adjustment Jig Positioning Step)

The optical axis adjustment jig positioning step ST2 is a step of positioning the optical axis adjustment jig 50 for applying the laser beam 21 through the flat parallel-surface plate 42 to the image capturing unit 43. According to the present embodiment, in the optical axis adjustment jig positioning step ST2, the beam detecting unit 40 is placed in a predetermined position on the holding surface 11. According to the present embodiment, the predetermined position on the holding surface 11 is a central position on the holding surface 11. However, according to the present invention, the predetermined position on the holding surface 11 is not limited to the central position on the holding surface 11. After the beam detecting unit 40 has been placed in the predetermined position on the holding surface 11, control goes to the image capturing step ST3.

(Image Capturing Step)

Figure 6:
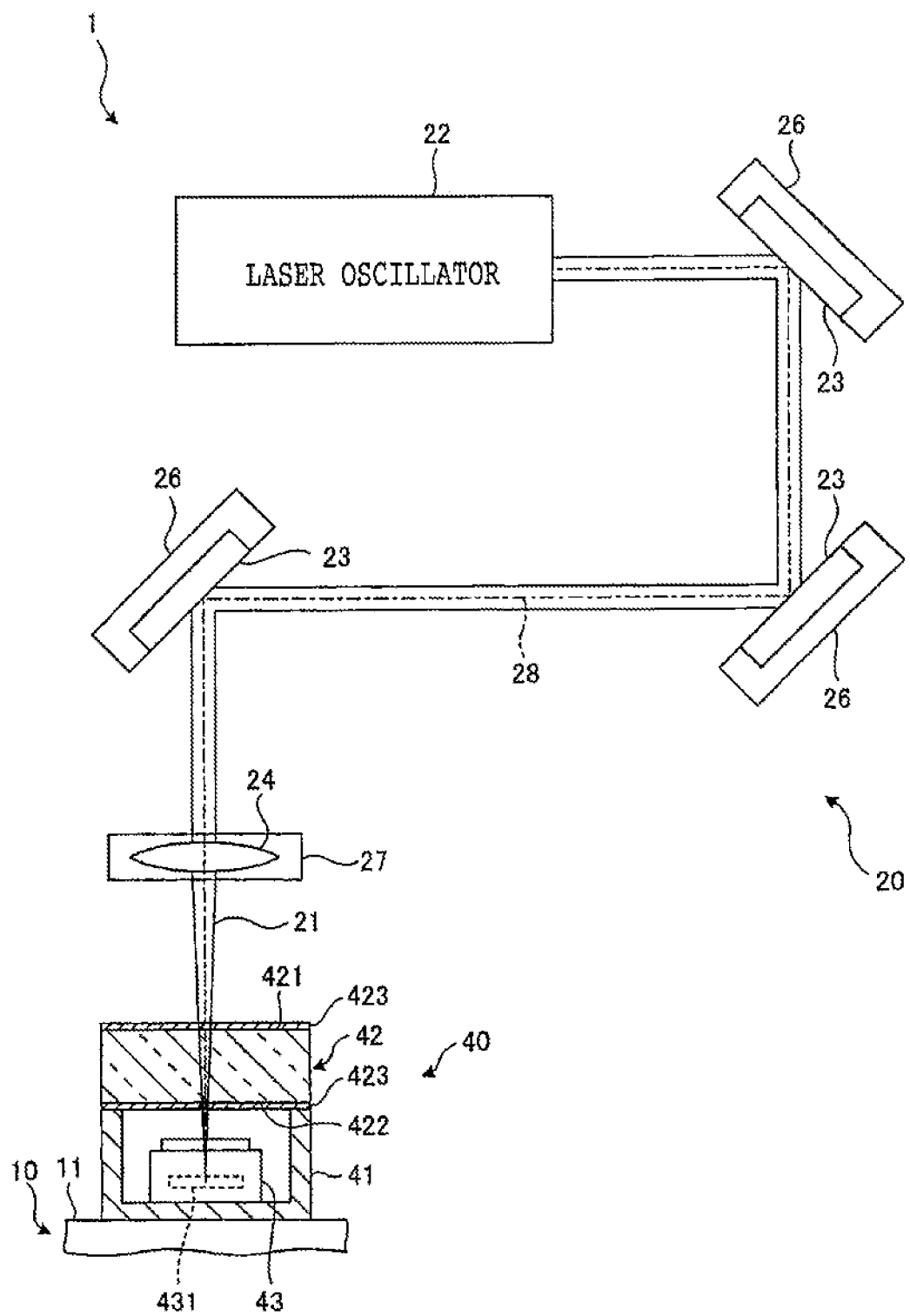
FIG. 6 is a schematic view, partly in cross section, illustrating an image capturing step of the optical axis confirming method illustrated in FIG. 5.
Figure 7:
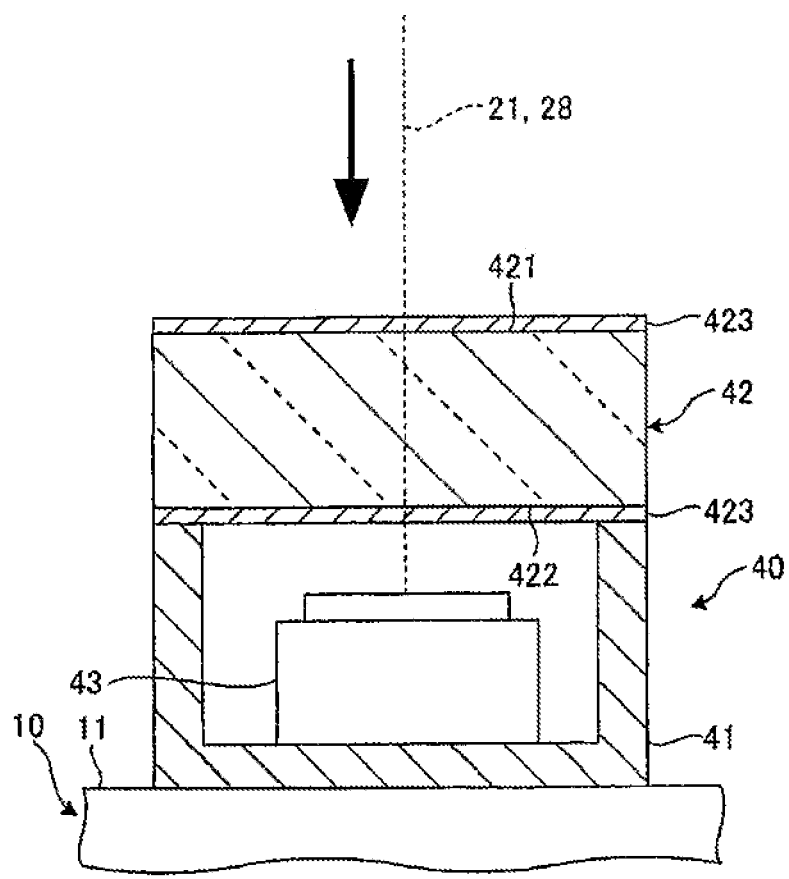
FIG. 7 is a cross-sectional view schematically illustrating a manner in which the optical axis of a laser beam is parallel to Z-axis directions in the image capturing step illustrated in FIG. 6.
Figure 8:
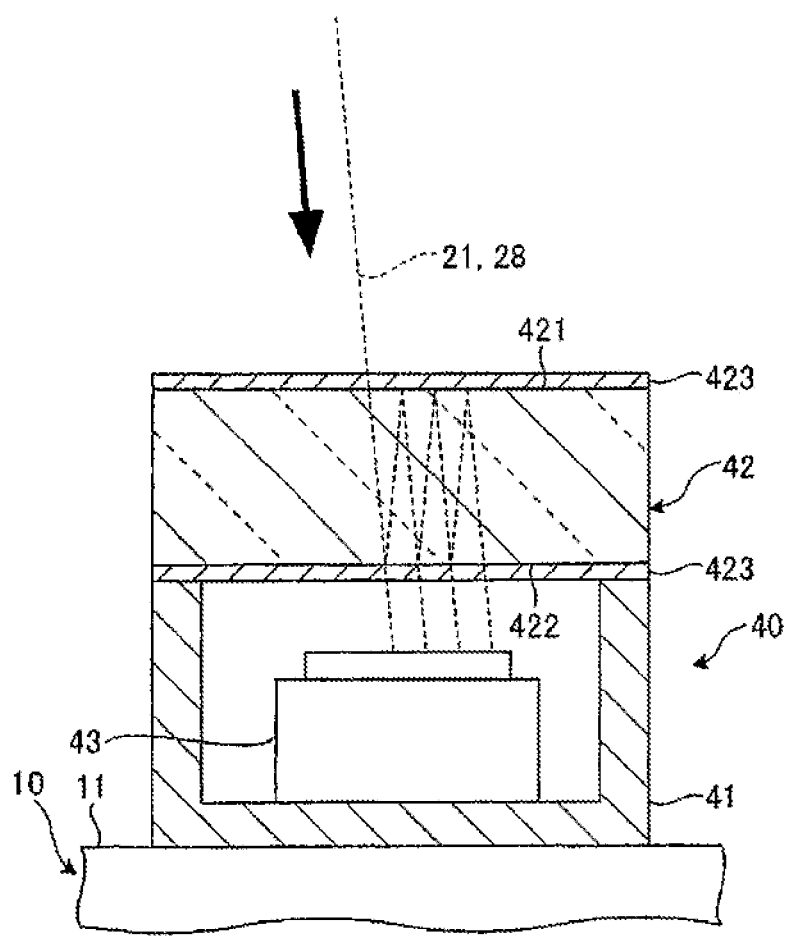
FIG. 8 is a cross-sectional view schematically illustrating a manner in which the optical axis of the laser beam is slanted with respect to the Z-axis directions in the image capturing step illustrated in FIG. 6.

FIG. 6 schematically illustrates, partly in cross section, the image capturing step ST3 of the optical axis confirming method illustrated in FIG. 5. FIG. 7 schematically illustrates in cross section a manner in which the optical axis 28 of the laser beam 21 is parallel to the Z-axis directions in the image capturing step ST3 illustrated in FIG. 6. FIG. 8 schematically illustrates in cross section a manner in which the optical axis 28 of the laser beam 21 is slanted with respect to the Z-axis directions in the image capturing step ST3 illustrated in FIG. 6.

The image capturing step ST3 is a step, carried out after the optical axis adjustment jig positioning step ST2, in which the laser beam 21 is emitted and applied to the image capturing unit 43 and the image capturing unit 43 captures an image of the laser beam 21. According to the present embodiment, in the image capturing step ST3, in response to an operator's action on the input unit, the control unit 100 operates the moving assembly 30 to adjust the positions of the chuck table 10 in the X-axis directions and the Y-axis directions to bring the beam detecting unit 40, which has been placed on the holding surface 11 of the chuck table 10, in facing relation to the condensing lens 24 of the laser beam applying unit 20 along the Z-axis directions.

In the image capturing step ST3, as illustrated in FIG. 6, the laser processing apparatus 1 emits the laser beam 21 from the laser oscillator 22, and the image capturing unit 43 of the beam detecting unit 40 captures an image of the laser beam 21 through the flat parallel-surface plate 42. In the image capturing step ST3, if the optical axis 28 of the laser beam 21 lies parallel to the Z-axis directions, then, as illustrated in FIG. 7, the optical axis 28 of the laser beam 21 applied to the flat parallel-surface plate 42, the optical axis 28 of a laser beam 21 transmitted through the reflective film 423 on the upper surface 421 of the flat parallel-surface plate 42 and reflected by the reflective film 423 on the lower surface 422 thereof, and the optical axis 28 of a laser beam 21 transmitted through the reflective films 423 on the upper and lower surfaces 421 and 422 of the flat parallel-surface plate 42 are aligned with each other.

In the image capturing step ST3, if the optical axis 28 of the laser beam 21 is tilted from the Z-axis directions, then, as illustrated in FIG. 8, since the laser beam 21 is reflected along multiple paths in the flat parallel-surface plate 42 by the reflective films 423 on the upper and lower surfaces 421 and 422 of the flat parallel-surface plate 42, the laser beam 21 is positionally shifted in the flat parallel-surface plate 42 each time the laser beam 21 is reflected. The image capturing unit 43 captures an image of the laser beam 21 that has been transmitted through the reflective films 423 on the upper and lower surfaces 421 and 422.

In the image capturing step ST3, the laser beam 21 is applied through the flat parallel-surface plate 42 to the image capturing unit 43. According to the present embodiment, in the image capturing step ST3, the image capturing unit 43 captures an image of the laser beam 21 applied thereto, and outputs the captured image to the display unit 101 and the control unit 100. Thereafter, control goes to the displaying step ST4.

(Displaying Step)

Figure 9:
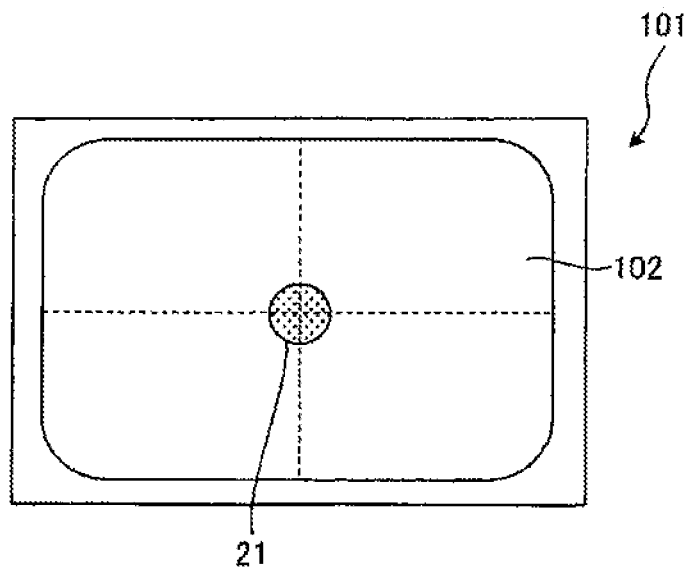
FIG. 9 is a schematic view illustrating a manner in which a display unit displays the laser beam illustrated in FIG. 7 in a displaying step of the optical axis confirming method illustrated in FIG. 5.
Figure 10:
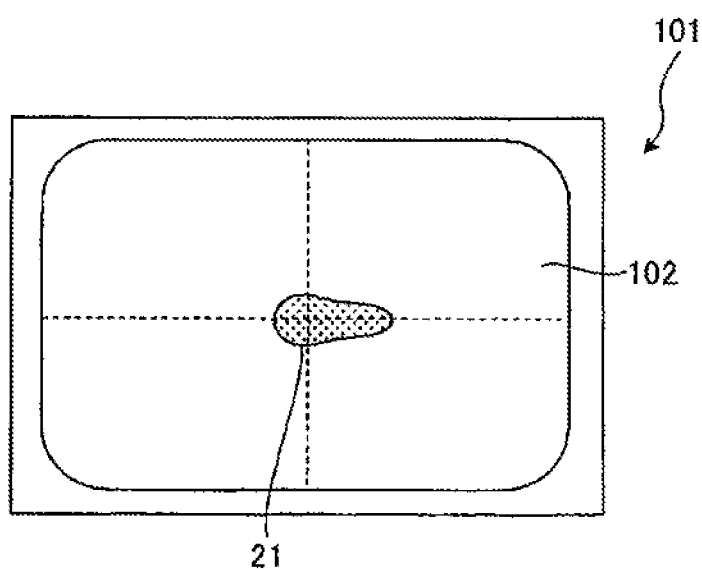
FIG. 10 is a schematic view illustrating a manner in which the display unit displays the laser beam illustrated in FIG. 8 in the displaying step of the optical axis confirming method illustrated in FIG. 5.

FIG. 9 schematically illustrates a manner in which the display unit 101 displays the laser beam 21 illustrated in FIG. 7 in the displaying step ST4 of the optical axis confirming method illustrated in FIG. 5. FIG. 10 schematically illustrates a manner in which the display unit 101 displays the laser beam 21 illustrated in FIG. 8 in the displaying step ST4 of the optical axis confirming method illustrated in FIG. 5.

The displaying step ST4 is a step in which the display unit 101 displays the image captured by the image capturing unit 43, as illustrated in FIGS. 9 and 10. In the displaying step ST4, as illustrated in FIGS. 9 and 10, the display unit 101 displays the image captured by the image capturing unit 43 on the display screen 102. After the displaying step ST4, control goes to the tilt detecting step ST5.

(Tilt Detecting Step)

The tilt detecting step ST5 is a step of detecting the tilt of the optical axis 28 of the laser beam 21 whose image has been captured by the image capturing unit 43, on the basis of the shape of the beam spot of the laser beam 21 in the image captured by the image capturing step ST3.

When the optical axis 28 of the laser beam 21 lies parallel to the Z-axis directions, i.e., when the laser beam 21 is applied perpendicularly to the flat parallel-surface plate 42, as illustrated in FIG. 7, the beam spot of the laser beam 21 whose image has been captured by the image capturing unit 43 and displayed on the display unit 101 has a minimum area as illustrated in FIG. 9. According to the present embodiment, inasmuch as the laser beam 21 applied to the flat parallel-surface plate 42 has a circular cross-sectional shape in a plane perpendicular to the optical axis 28, when the laser beam 21 is applied perpendicularly to the flat parallel-surface plate 42, the image of the beam spot of the laser beam 21 captured by the image capturing unit 43 and displayed on the display unit 101 is of a circular shape as illustrated in FIG. 9.

However, when the optical axis 28 of the laser beam 21 is tilted from the Z-axis directions, i.e., when the laser beam 21 is applied slantwise to the flat parallel-surface plate 42, as illustrated in FIG. 8, according to the present embodiment, even though the laser beam 21 applied to the flat parallel-surface plate 42 has a circular cross-sectional shape in a plane perpendicular to the optical axis 28, the image of the beam spot of the laser beam 21 captured by the image capturing unit 43 and displayed on the display unit 101 is of an elliptical shape, as illustrated in FIG. 10, that is larger in area than the circular shape illustrated in FIG. 9. According to the present invention, even in a case where the cross-sectional shape of the laser beam 21 in a plane perpendicular to the optical axis 28 is elliptical, when the laser beam 21 is applied slantwise to the flat parallel-surface plate 42, the area of the beam spot of the laser beam 21 displayed on the display unit 101 increases. According to the present embodiment, when the area of the beam spot of the laser beam 21 whose image has been captured by the image capturing unit 43 is of a minimum value, the optical axis 28 of the laser beam 21 lies parallel to the Z-axis directions.

In the tilt detecting step ST5, the control unit 100 extracts the laser beam 21 from the image captured by the image capturing unit 43. In the tilt detecting step ST5, the control unit 100 calculates the area of the beam spot of the laser beam 21 extracted from the image captured by the image capturing unit 43, detects the tilt of the laser beam 21 from the Z-axis directions by referring to the relation, stored in advance, between tilts from the Z-axis directions of the laser beam 21 whose images has been captured by the image capturing unit 43 and areas of the laser beam 21 in the images captured by the image capturing unit 43, and displays the detected tilt on the display unit 101.

In the tilt detecting step ST5, moreover, the control unit 100 can calculate a direction in which the optical axis 28 is tilted from the length of the beam spot in its longitudinal direction and the direction in which the beam spot is shifted in the image captured by the image capturing unit 43, and can display the calculated direction on the display unit 101.

In the tilt detecting step ST5, therefore, the optical axis adjustment jig 50 is capable of detecting the tilt of the optical axis 28 of the laser beam 21 from the Z-axis directions on the basis of the shape of the beam spot of the laser beam 21 in the image captured by the image capturing unit 43.

Then, while referring to the image captured by the image capturing unit 43 and displayed on the display unit 101, the operator operates the adjusting mechanisms 261 of the holders 26 and 27 that hold the mirrors 23 and the condensing lens 24 as optical devices of the laser beam applying unit 20 to adjust the optical axis 28 of the laser beam 21 so as to lie parallel to the Z-axis directions, on the basis of the tilt of the optical axis 28 of the laser beam 21 from the Z-axis directions and the direction in which the optical axis 28 is tilted from the Z-axis directions, detected in the tilt detecting step ST5. When the operator has thus adjusted the optical axis 28 of the laser beam 21, the method of confirming the optical axis of a laser processing apparatus according to the present embodiment comes to an end.

As described above, the optical axis adjustment jig 50 and the method of confirming the optical axis of a laser processing apparatus according to the present embodiment reside in that the optical axis adjustment jig 50 includes the flat parallel-surface plate 42 disposed on the image capturing unit 43 and the shape of the beam spot of the laser beam 21 whose image has been captured by the image capturing unit 43 varies depending on the tilt of the optical axis 28 from the Z-axis directions. The optical axis adjustment jig 50 and the method of confirming the optical axis of a laser processing apparatus according to the present embodiment also reside in that the tilt of the optical axis 28 of the laser beam 21 from the Z-axis directions is detected on the basis of the shape of the beam spot of the laser beam 21 whose image has been captured by the image capturing unit 43. As a result, the optical axis adjustment jig 50 and the method of confirming the optical axis of a laser processing apparatus according to the present embodiment are advantageous in that it is possible to quantitatively assess whether or not the optical axis 28 of the laser beam 21 is perpendicular to the workpiece 200.

[Modifications]

Figure 11:
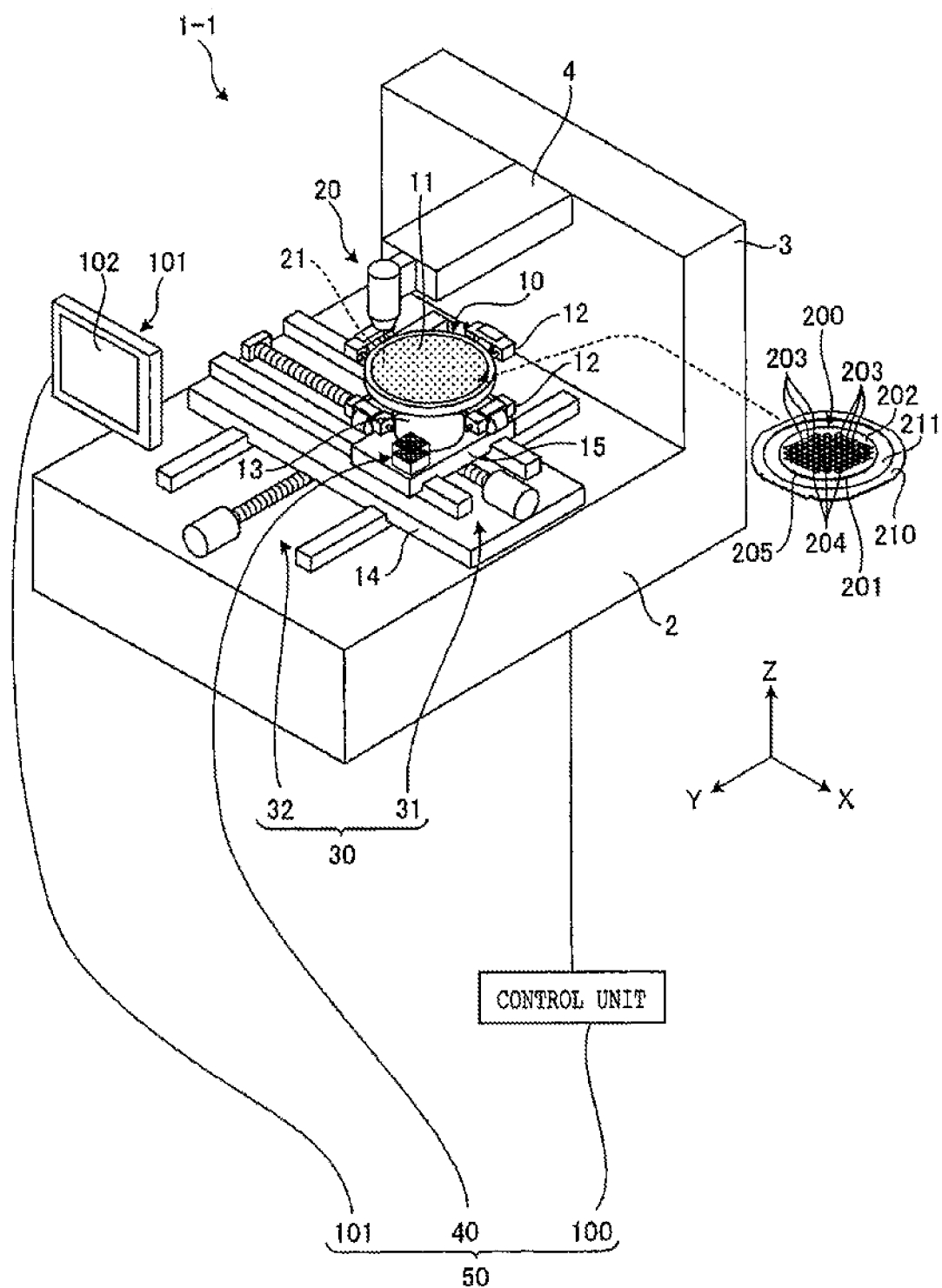
FIG. 11 is a perspective view illustrating a configuration example of a laser processing apparatus that carries out a method of confirming an optical axis of a laser processing apparatus according to a first modification of the embodiment.
Figure 12:
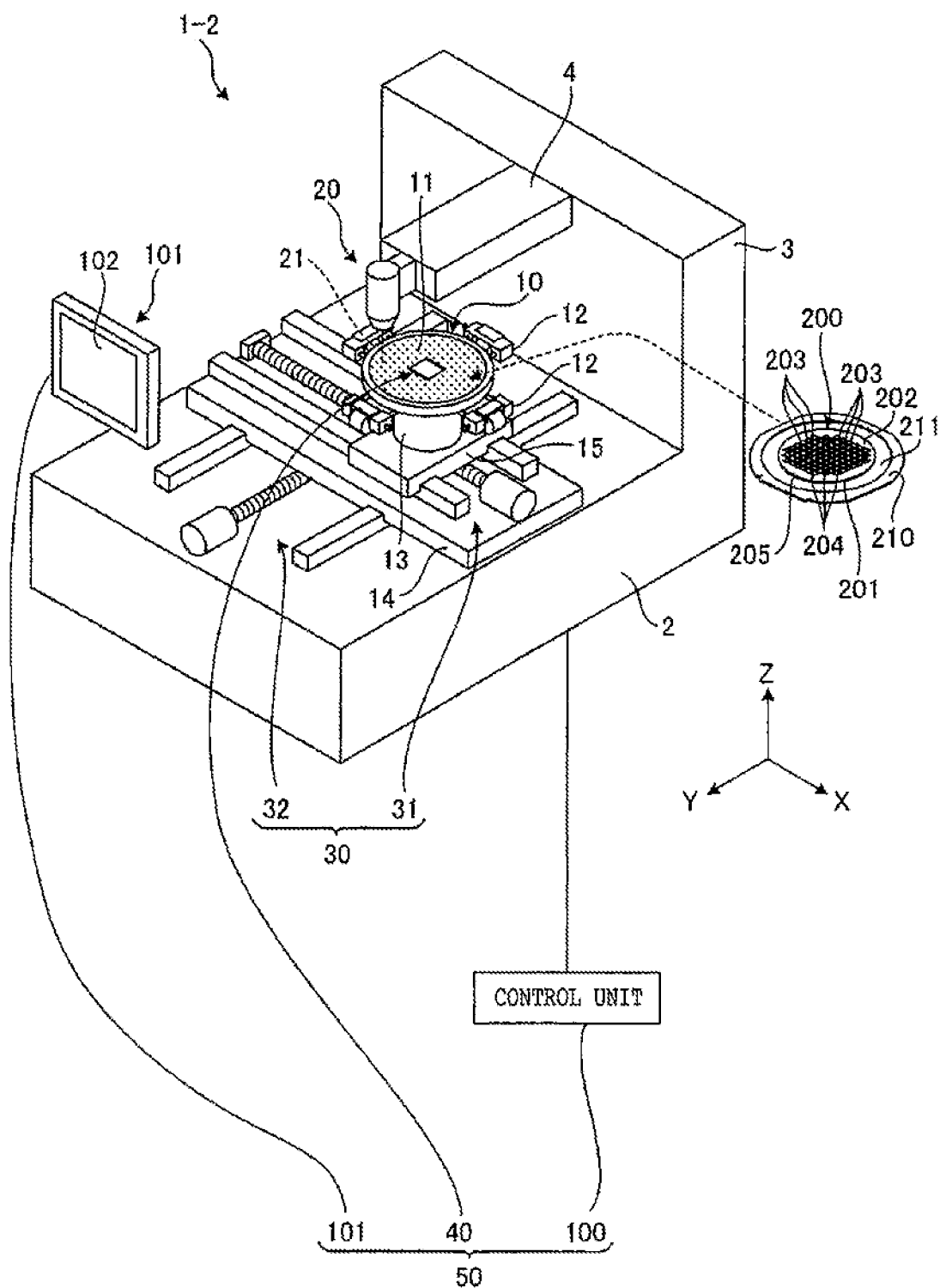
FIG. 12 is a perspective view illustrating a configuration example of a laser processing apparatus that carries out a method of confirming an optical axis of a laser processing apparatus according to a second modification of the embodiment.

Methods of confirming the optical axis of a laser processing apparatus according to modifications of the embodiment of the present invention will be described below with reference to the drawings. FIG. 11 illustrates in perspective a configuration example of a laser processing apparatus that carries out a method of confirming an optical axis of a laser processing apparatus according to a first modification of the embodiment, and FIG. 12 illustrates in perspective a configuration example of a laser processing apparatus that carries out a method of confirming an optical axis of a laser processing apparatus according to a second modification of the embodiment. Those parts illustrated in FIGS. 11 and 12 which are identical to those according to the above embodiment are denoted by identical reference characters, and their description will be omitted below.

The method of confirming the optical axis of a laser processing apparatus according to the first modification is similar to the method according to the above embodiment except that, as illustrated in FIG. 11, the beam detecting unit 40 is disposed in a predetermined position on the second moving plate 15 of a laser processing apparatus 1-1, the preparatory step ST1 and the optical axis adjustment jig positioning step ST2 are not carried out, and the laser beam applying unit 20 is disposed opposite the beam detecting unit 40 on the second moving plate 15 along the Z-axis directions in the image capturing step ST3.

The method of confirming the optical axis of a laser processing apparatus according to the second modification is similar to the method according to the above embodiment except that, as illustrated in FIG. 12, the beam detecting unit 40 is disposed in the holding surface 11 of the chuck table 10 of a laser processing apparatus 1-2, the preparatory step ST1 and the optical axis adjustment jig positioning step ST2 are not carried out, and the laser beam applying unit 20 is disposed opposite the beam detecting unit 40 in the holding surface 11 along the Z-axis directions in the image capturing step ST3. According to the second modification, it is desirable that the flat parallel-surface plate 42 lie flush with or be disposed beneath the holding surface 11.

The optical axis adjustment jigs 50 and the methods of confirming the optical axis of a laser processing apparatus according to the first and second modifications are advantageous in that since the tilt of the optical axis 28 of the laser beam 21 from the Z-axis directions is detected on the basis of the shape of the beam spot of the laser beam 21 whose image has been captured by the image capturing unit 43, it is possible to quantitatively assess whether or not the optical axis 28 of the laser beam 21 is perpendicular to the workpiece 200, as is the case with the above embodiment.

The present invention is not limited to above embodiment and modifications, but various changes and modifications may be made therein without departing from the scope of the invention. According to the embodiment and modifications, the image of the beam spot of the laser beam 21 captured by the image capturing unit 43 is displayed on the display unit 101. However, according to the present invention, only a portion, where the beam intensity exceeds a predetermined value, of the image of the beam spot of the laser beam captured by the image capturing unit 43 may be displayed on the display unit 101. According to the present invention, moreover, the tilt detecting step ST5 may not be carried out, and the operator may operate the adjusting mechanisms 261 of the holders 26 and 27 while observing the image of the beam spot of the laser beam 21 displayed on the display unit 101 to adjust the optical axis 28 of the laser beam 21 so as to lie parallel to the Z-axis directions in the displaying step ST4.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. An optical axis adjustment jig comprising:
a flat parallel-surface plate having an upper surface and a lower surface with reflective films disposed respectively thereon; and
an image capturing unit disposed beneath the flat parallel-surface plate for capturing an image of a laser beam applied thereto,
wherein the flat parallel-surface plate is made of a material that is transmissive of a wavelength of the laser beam,
the laser beam is applied through the flat parallel-surface plate to the image capturing unit,
a tilt of an optical axis of the laser beam is detected on a basis of an image, captured by the image capturing unit, of internal reflections in the flat parallel-surface plate of the laser beam, wherein the tilt of the optical axis of the laser beam is based on an angle between the optical axis and a surface of the image capturing unit, and
an adjustment mechanism configured for adjusting the tilt of the optical axis of the laser beam based on the image captured by the image capturing unit.

2. The optical axis adjustment jig according to claim 1, further comprising:
a display unit for displaying the image captured by the image capturing unit.

3. A method of confirming an optical axis of a laser processing apparatus including
a chuck table for holding a workpiece thereon,
a laser beam applying unit for processing the workpiece held on the chuck table by applying a laser beam from a laser oscillator thereto, and
a moving assembly for moving the chuck table and the laser beam applying unit relatively to each other in X-axis directions and Y-axis directions perpendicular to the X-axis directions,
the method comprising:
a preparatory step of preparing an optical axis adjustment jig including a flat parallel-surface plate made of a material that is transmissive of a wavelength of the laser beam and having an upper surface and a lower surface with reflective films disposed respectively thereon, and an image capturing unit disposed beneath the flat parallel-surface plate for capturing an image of the laser beam;
an optical axis adjustment jig positioning step of positioning the optical axis adjustment jig for applying the laser beam through the flat parallel-surface plate to the image capturing unit;
an image capturing step, after the optical axis adjustment jig positioning step, of applying the laser beam emitted from the laser oscillator to the image capturing unit and capturing an image of the laser beam applied to the image capturing unit;
a tilt detecting step of detecting a tilt of an optical axis of the laser beam on a basis of an image, captured by the image capturing unit, of internal reflections in the flat parallel-surface plate of the laser beam; and
an adjusting step of adjusting the tilt of the optical axis of the laser beam based on the image captured in the image capturing step.

4. The method of confirming the optical axis of a laser processing apparatus according to claim 3, wherein the laser processing apparatus further includes a display unit for displaying the image captured by the image capturing unit.

5. The optical axis adjustment jig according to claim 1, further comprising a casing, wherein the flat parallel-surface plate is supported on the casing and the image capturing unit is enclosed by the casing.

* * * * *